Dec. 19, 1961   P. E. PERRY   3,013,643
FASTENER AND CUSHIONING STRUCTURE UTILIZING THE SAME
Filed June 19, 1959

INVENTOR.
PAUL E. PERRY
BY Dwight L. Moody

ATTY.

United States Patent Office 3,013,643
Patented Dec. 19, 1961

3,013,643
FASTENER AND CUSHIONING STRUCTURE
UTILIZING THE SAME
Paul E. Perry, Akron, Ohio, assignor to The B. F. Goodrich Company, New York, N.Y., a corporation of New York
Filed June 19, 1959, Ser. No. 821,515
10 Claims. (Cl. 189—36)

The invention relates to fasteners for use in structures, especially cushioned structures, which fasteners include a connecting element associated with a hollow body or rivet of deformable elastomeric material. The invention also relates to detachably interconnected and cushioned structures including spaced members united by such fasteners.

The fastener of the invention comprising a connecting element associated with a hollow body or rivet of deformable elastomeric material produces a detachably interconnected and cushioned structure by uniting spaced members of the structure by operation of the fastener from one side only of the structure in a manner to axially shorten and compress and laterally deform the said hollow body to a predetermined extent. To these ends, the said hollow body of the fastener includes integral head and shank portions of the deformable elastomeric material, attachment means for releasably, adjustably engaging the said connecting element axially along the latter, and means for limiting the axial shortening and deformation of said body, both said means coacting to predetermine the extent of axial compression and lateral deformation of the body. When the spaced members are united by the fastener, one member is clamped and cushioned between the axially compressed, laterally deformed elastomeric head portion and the axially compressed, outwardly bulged elastomeric shank portion of the said body, while the connecting element releasably engaging said means of the body holds the other member seated against the said compressed head portion in spaced relation to said one member, whereby relative movement and vibration of the two members are cushioned elastically and sound transmittal from one member to the other member of the structure is minimized. The said hollow body has provision for rigidly, internally backing the deformable elastomeric material to resist lateral shear thereof due to such relative movement of the two members, and has provision for stability, especially laterally, of the fastener when said body is axially shortened and compressed and laterally deformed.

Objects of the invention are to provide an improved fastener for uniting two members in spaced cushioned relationship; to provide an improved hollow body or rivet of deformable elastomeric material for constituting a part of such fastener; to provide an improved detachably interconnected and cushioned structure with spaced members joined by the aforesaid fastener by operation of the latter from one side only of the structure; to provide for predetermining the lateral deformation and the extent of axial shortening of the said rivet; to provide for permitting the application of a high torque load during the axial shortening of the rivet; to provide for resiliently cushioning relative axial and lateral movement of the two members united by the fastener; to provide for accommodating limited movement of one member relative to the other member of the cushioned structure; to provide for avoiding the transmittal of vibration and sound from one member to the other member of the structure; to provide for resisting shear of the rivet during relative lateral movement of the spaced members of the cushioned structure; to provide for relatively high tension in the connecting element for improved resistance to loosening and for good holding power of the connecting element without exceeding the elastic limit of the elastomeric material of the rivet and without reducing the grip of the rivet with a member of the cushioned structure; to provide for stability of the rivet; and to provide for simplicity of construction, inexpensiveness and convenience of manufacture and servicing, and for effectiveness of operation.

These and other objects and advantages of the invention will be apparent from the following description.

In the accompanying drawings which constitute a part of this specification and in which like numerals are employed throughout to designate like parts;

Figure 1:
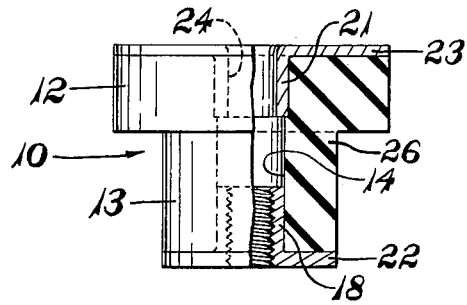
FIG. 1 is a side elevation of an expansible hollow rivet of elastomeric material constructed in accordance with and embodying the invention, parts being broken away and in section.
Figure 2:
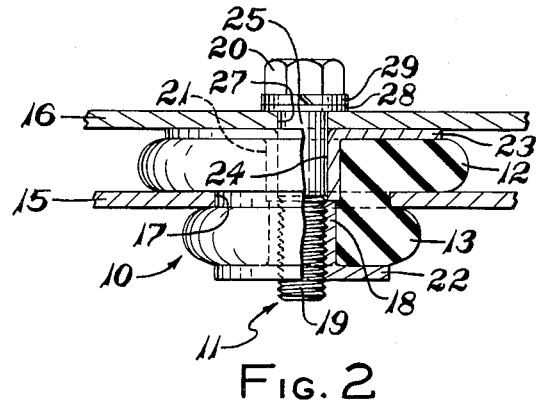
FIG. 2 is a view showing a cushioned structure utilizing a fastener including the rivet shown in FIG. 1 in its axially shortened, elastically deformed condition, parts being broken away and in section.

The preferred embodiment of the invention provides a fastener comprising a hollow cushioning body or expansible hollow rivet 10 of deformable elastomeric material constructed and arranged as shown in FIG. 1, and a rigid connecting element 11 capable of separably engaging and applying axially directed compressive force to the rivet to thereby axially shorten and compress and laterally deform the rivet 10 to the configuration shown in FIG. 2. The cushioning body or rivet 10 is preferably molded and cured by known apparatus and method and includes integral head 12 and shank portions 13 of deformable elastomeric material with an axial bore 14 therethrough.

For uniting two members 15 and 16 in spaced cushioned relationship as shown in FIG. 2, the shank portion 13 of the cushioning body or rivet 10 "as molded" is adapted to extend through and beyond an opening or aperture 17 in one of the members, namely, the member 15, and the enlarged head portion 12 of the cushioning body or rivet 10 is adapted to be positioned between the spaced members 15 and 16. The cushioning body or rivet 10 includes attachment means 18 releasably and adjustably engageable with a shank 19 of the rigid connecting element 11 axially along the latter. The connecting element includes a head 20 engageable with the other of said members, namely, member 16 as shown in FIG. 2. The cushioning body or rivet 10 also includes means stop element 21 coacting with attachment means 18 for predetermining and limiting the extent of axial shortening and lateral deformation of the cushioning body.

For good holding power and maximum damping and resilient cushioning together with minimum transmittal of vibrations and sounds from one member 15, for example, to the other member 16, the deformable elastomeric material of the integral head 12 and shank 13 portions may be natural or synthetic rubber, or other rubber-like or elastomeric material having substantially similar chemical composition or physical properties to natural rubber and to equivalents therefor, and capable of undergoing under appropriate influences such as heat, pressure and the action of a chemical substance, a change from an essentially plastic flowable condition to a relatively firmer or harder, more elastic and resilient condition. Preferably, the deformable elastomeric material of the rivet 10 is a suitable butyl rubber composition with a hardness within the range of 60 to 90 durometer so as to provide for good damping of vibratory movements and shocks and the desired resilience and resistance to ozone, sunlight, aging, cracking and other objectionable deterioration.

The particular cushioning body or expansible hollow rivet 10 shown in FIG. 1 has the deformable elastomeric head portion 12 desirably of the circular, substantially uniform thickness, flat head type, although not necessarily limited thereto, since other known type heads to fit the contour of the members 15, 16 may be provided. The head portion 12 is of sufficient thickness and diameter to provide stable resilient cushioning and effective damping and resistance to the transmittal of sound and other vibrations, together with maintenance of the desired spacing between the members 15 and 16 to prevent their contacting one another in service. In the preferred construction shown in FIG. 1, the head portion 12 may be of substantially the same or slightly greater thickness than the maximum thickness of the elastomeric wall of the integral shank portion 13 which is desirably of substantially uniform outside diameter throughout its axial length, although not necessarily limited thereto, since a slight taper of the portion 13 may be provided to facilitate insertion of the rivet. The elastomeric wall of the shank portion 13 is continuous and annular and preferably of substantially uniform thickness for the non-tapered construction shown in FIG. 1, hence is tubular and cylindrical.

The attachment means 18 shown in FIG. 1, is a rigid, internally threaded, member-engaging element portion disposed within the uniform diameter axial bore 14 in the shank portion 13 at a position spaced from the head portion 12 and desirably extending axially to the free end of the shank portion 13 of the rivet. The member-engaging element 18 is made of steel, although not necessarily limited thereto, since other strong rigid metal or plastic material may be used. The radially outer surface of the member-engaging element 18 contacting the elastomeric material in the bore 14 of the shank portion 13 may be smooth and of substantially uniform outside diameter. The member-engaging element 18 has preferably an integral, radial, continuous, annular end flange force-transmitting portion 22 of suitable uniform thickness and stiffness and uniformly flat throughout, although not necessarily limited thereto, since the thickness can be reduced and the stiffness increased by providing the end flange 22 with a plurality of circumferentially-spaced radially-extending ribs projecting axially toward the head portion 12. The end flange has, as shown in FIG. 1, an outside diameter equal to that of the shank portion 13 so that it may entirely cover and is seated against the adjacent flat axial outer end face of the shank portion 13 to facilitate the desired axial shortening and lateral deformation of the rivet 10, while resisting objectionable bending and distortion of the end flange 22. The entire element 18 is desirably first flash coated with zinc, then the axially inner surface of the end flange 22 is sandblasted and given a thin coating of a suitable known liquid cement to facilitate securely bonding the end flange only of the element 18 to the shank portion 13 during the cure. This secures the element 18 to the shank portion 13 yet permits relatively free axial shortening and lateral deformation of the entire shank portion.

The member-engaging element 18 thus is held to the cushioning body 10 and fixedly engages the free end portion of the shank portion 13, and has its continuous annular wall of suitable substantially uniform thickness and stiffness to resist distortion and buckling. The element 18 is provided with internal thread convolutions of sufficient size and number to resist stripping of the threads under the load conditions encountered in service by the fastener, when it detachably interconnects and cushions the pair of spaced-apart rigid apertured members 15 and 16 as shown in FIG. 2. In this connection, it is desirable that the elastomeric continuous annular wall of the shank portion 13 has a substantially uniform thickness at least two or three times that of the continuous annular or tubular wall of the rigid member-engaging element 18 and of sufficient thickness to provide the desired laterally outward annular bulge against the side of the member 15 remote from the member 16 and the desired damping, cushioning and resistance to lateral shear stresses.

The means 21 coacting with the element 18 for limiting and predetermining the extent of elastic deformation and axial shortening of the cushioning body or rivet 10 may be a rigid, hollow or tubular, stop element of steel or other suitable rigid material disposed within the axial bore 14 in the head portion 12. The stop element 21 has a length at least approximately equal to the major part of the thickness of the elastomeric head portion 12 and may even, for some applications of the fastener, extend axially entirely through the head portion 12 and slightly into the shank portion 13, but in all constructions terminates short of and spaced from the member-engaging element 18. The stop element 21 may be frictionally held within the bore 14 in the head portion 12 by a press fit, or if desired, may be suitably adhesively bonded to the elastomeric material of the head portion 12.

The stop element 21 preferably includes an integral radial annular end flange 23 of suitable thickness and stiffness and of suitable configuration such for example as circular. The end flange 23 covers at least the major part of the area of and may entirely cover the flat outer or upper surface of the elastomeric head portion 12 in its "as molded" condition as shown in FIG. 1, against which upper surface the end flange 23 seats to facilitate uniform load distribution to and elastic deformation of such portion 12. The stop element 21 has a continuous annular or tubular wall desirably of substantially uniform outside diameter and suitable thickness and stiffness to resist distortion and buckling. Increased stiffness may be provided by means of axially extending radially outward ribs in the tubular wall and axially inward radial ribs in the end flange of the stop element 21. The stop element has desirably a substantially uniform diameter bore 24 of less diameter than that in the shank portion 13 but of greater diameter than that in the internally threaded bore of the member-engaging element 18 so as to accommodate the smooth portion 25 of the connecting element 11 which may be a steel bolt having a multi-sided head 20 and having a threaded end portion of the shank 19. The annular walls and the bores of the elements 18 and 21, respectively, are in axial alignment to permit subsequent end-to-end abutment of said annular walls and to accommodate the bolt 11 as shown in FIG. 2.

In the particular embodiment shown in FIG. 1, the axially inner end of the stop element 21 terminates short of but adjacent the lower flat surface of the head portion 12 to provide between the spaced-apart elements 18 and 21 an elastomeric expansible intermediate portion 26 of the shank portion 13 free from restriction to deformation, axially and laterally, and adapted to project beyond the side of the member or work piece 15 remote from the other member or work piece 16. This expansible intermediate portion 26, when axially shortened and laterally or radially outwardly deformed, coacts with the remainder (i.e. axially along the element 18) of the elastomeric material of the shank portion 13 to provide the desired continuous annular outward bulge engaging the member or work piece 15 to hold the same clamped firmly between the elastically deformed head portion 12 and the bulge, when the fastener detachably interconnects and unites the members 15 and 16 as shown in FIG. 2.

The detachably interconnected and cushioned structure shown in FIG. 2, is produced by utilizing the fastener of the invention including the cushioning body or expansible hollow rivet 10 of deformable elastomeric material in the relaxed "as molded" condition shown in FIG. 1. The rivet 10 in said condition is positioned with the integral head portion 12 having its elastomeric lower surface contacting and seated against one side of the member or work piece 15 and with the integral shank portion 13 extending through the aperture 17 and beyond the other side of the member 15. The member or work piece 16 is superimposed in contact with and seated conformingly against the flat annular flange 23 of the stop element 21 with the aperture 27 in the member 16 in register with the axial bore 14 in the rivet 10. The connecting fastener element or headed bolt 11 may be inserted shank 19 first through openings in a suitable metal washer 28 and lock washer 29 and then inserted, by operation from the upper side of the member 16, through the aperture 27 in the member 16 and through the axial bore 14 in the head portion 12 of the rivet. The bolt 11 is next rotated in a manner to seat the washers 28, 29 and the head 20 against the member 16 and to progressively engage all or substantially all the thread convolutions in the member-engaging element 18, thereby applying axially directed compressive force to the elastomeric intregal head 12 and shank 13 portions of the rivet 10. This progressively reduces the thickness of the deformable head portion 12 and axially shortens the length of the deformable shank portion 13, while at the same time producing lateral deformation of the head portion 12 and the shank portion 13 including its cylindrical expansible intermediate portion 26.

During the screwing of the bolt 11 into threaded engagement with the rivet 10, the deformable head portion 12 is held between the spaced members 15 and 16, but the end portion of the deformable shank portion 13 with the member-engaging element 18 therein can move axially toward the head portion 12. Thus, when the bolt 11 is being tightened, the means 18 or member-engaging element progressively moves axially toward the means 21 or stop element until the respective annular inner ends of the elements 18 and 21 abut firmly against one another, after which a relatively high torque load and tension stress can be applied to the bolt 11 without failure of the fastener. This end-to-end abutment of the continuous annular walls of the elements 18 and 21 provides a hollow substantially cylindrical stiffening column extending axially between the spaced-apart rigid annular end flanges 22 and 23, respectively, which column encloses and is braced by the shank 19 of the bolt 11 and withstands said torque load.

The abutment of the annular inner ends of the elements 18 and 21, as shown in FIG. 2, occurs within the thickness of the member 15, although not necessarily limited thereto, since the abutment position can be changed by axially lengthening or shortening either or both elements 18 and 21. Thus, the invention provides a continuous annular rigid wall internally backing the surrounding elastomeric material at the member 15 so as to resist effectively shear of the deformable shank portion 13 under relative lateral movement of the members 15 and 16.

Minimum frictional resistance to rotation of the bolt 11 during the tightening operation is offered by the elastomeric material of the expansible intermediate portion 26 because it is free of restriction to deformation, especially laterally outward deformation, and because the major part of it projects beyond the member or work piece 15, when the axial shortening and lateral deformation of the rivet 10 is begun. The shank 19 of the bolt 11 resists laterally inward deformation of the intermediate portion 26 so that the natural tendency of the elastomeric material is to deform laterally outward to provide the desired annular bulge against the work piece 15 and to permit end-to-end abutment of the elements 18 and 21.

The fastener including the rivet 10 is suitable especially for use in walled structures where cushioning and ease and quickness of installation and removal are desired, and has been found particularly adapted for securely attaching in a cushioned detachable manner the body of an automobile to the frame thereof. In the latter application, the member 16 represents the automobile body and the member 15 represents the automobile frame. The resulting detachably interconnected and cushioning structure provides increased softness of the riding qualities of the automobile together with improved damping resistance to the transmittal of objectionable vibrations and sounds from the frame to the body of the automobile.

The embodiments of the invention in which an exclusive property or privilege is claimed are defined as follows:

1. A fastener for uniting two members in spaced cushioned relationship, said fastener comprising a cushioning body including integral head and tubular shank portions of deformable elastomeric material with an axial bore therethrough and with said shank portion of lesser outside diameter than that of said head portion, said body being adapted to be positioned with said shank portion extending through an opening in one of said members and with said head portion between the said members, a connecting element for said fastener provided with a head engageable with the other of said members and a shank adapted to extend through an opening in the latter member and extending into said axial bore, a stop element of lesser axial length than that of said body disposed within said axial bore and around said shank of the connecting element for limiting axial shortening of said body, the said cushioning body including attachment means held to said body and adjustably engageable with said connecting element axially along the latter, said attachment means including a force-transmitting portion bonded to the axial outer face of said shank portion of the body which force-transmitting portion has an outside diameter approximately equal to that of said shank portion, whereby when said attachment means is adjusted axially on said connecting element toward said head portion of the body, the said force-transmitting portion effects axial compression of said head portion between said members and also effects axial compression with consequent radial outward expansion of said shank portion on the side of the first mentioned member remote from the other of said members.

2. A fastener for uniting two members in spaced cushioned relationship, said fastener comprising a cushioning body including integral head and tubular shank portions of deformable elastomeric material with an axial bore therethrough and with said shank portion of lesser outside diameter than that of said head portion, said body being adapted to be positioned with said shank portion extending through an opening in one of said members and with said head portion between the said members, a connecting element for said fastener provided with a head engageable with the other of said members and a shank adapted to extend through an opening in the latter member and extending into said axial bore, a stop element of lesser axial length than that of said body disposed within said axial bore and around said shank of the connecting element for limiting axial shortening of said body, the said cushioning body including integral attachment means held to said body and adjustably engageable with said connecting element axially along the latter, said attachment means including a portion in said axial bore continuously engaging the wall of the latter to prevent radially inward expansion of said shank portion of the body and a force-transmitting portion bonded to the axial outer face of said shank portion of the body which force-transmitting portion has an outside diameter approximately equal to that of said shank portion, whereby when said attachment means is adjusted axially on said connecting element toward said head portion of the body, the said force-transmitting portion effects axial compression of said head portion between said members and also effects axial compression with consequent radial outward expansion of said shank portion on the side of the first-mentioned member remote from the other of said members.

3. A fastener for uniting two members in spaced cushioned relationship, said fastener comprising a cushioning body including integral head and shank portions of deformable elastomeric material with an axial bore therethrough and with said shank portion of lesser outside dimension laterally of said body than that of said head portion, said body being adapted to be positioned with its said shank portion extending through an opening in one of said members and with its said head portion between the said members, a connecting element for said fastener provided with a head engageable with the other of said members and a shank adapted to extend through an opening in the latter member and extending into said axial bore, the said cushioning body including integral attachment means held to said body and comprising a portion extending axially in said bore toward said head portion and engaging the wall of the said bore and being of lesser axial extent than that of said body and adjustably engageable with said connecting element axially along the latter, and said attachment means also comprising a force-transmitting portion of a diameter at least as great as the outside diameter of said shank portion and bonded to the axial outer face of said shank portion of the body, whereby when said attachment means is adjusted axially on said connecting element toward said head portion of the body, the said force-transmitting portion effects axial compression of said head portion of said body between said members and also effects axial compression with consequent lateral outward expansion of said shank portion on the side of the first-mentioned member remote from the other of said members.

4. A fastener for uniting two members in spaced cushioned relationship, said fastener comprising a cushioning body including integral head and tubular shank portions of deformable elastomeric material with an axial bore therethrough and with said shank portion of lesser outside diameter than that of said head portion, said body being adapted to be positioned with said shank portion extending through an opening in one of said members and with said head portion between the said members and said body being adapted to accommodate in said bore the shank of a headed connecting element for the fastener, a stop element of lesser axial length than that of said body disposed within said axial bore in engagement with the wall thereof and positionable around the shank of the headed connecting element for limiting axial shortening of said body, the said cushioning body including attachment means held to said body and adjustably engageable with the shank of said connecting element axially along the latter, said attachment means including a force-transmitting portion bonded to the axial outer face of said shank portion of the body which force-transmitting portion has an outside diameter not greater than that of said shank portion, whereby when said attachment means is adjusted axially on the said connecting element toward said head portion of the body, the said force-transmitting portion effects axial compression of said head portion between said members and also effects axial compression with consequent radial outward expansion of said shank portion on the side of the first-mentioned member remote from the other of said members.

5. A fastener for uniting two members in spaced cushioned relationship, said fastener comprising a cushioning body including integral head and shank portions of deformable elastomeric material with an axial bore therethrough and with said shank portion of lesser outside periphery laterally of said body than that of said head portion, said body being adapted to be positioned with its said shank portion extending through an opening in one of said members and with its said head portion between the said members and said body being adapted to accommodate in said bore the threaded shank of a headed connecting element of said fastener, the said cushioning body including integral attachment means held to said body and comprising an internally threaded tubular portion extending axially in said bore toward said head portion and engaging the wall of the said bore and being of lesser axial extent than that of said body and adjustably threadedly engageable with the shank of said connecting element axially along the latter, and said attachment means also comprising a force-transmitting portion of a diameter at least as great as the outside diameter of said shank portion and bonded to the axial outer face of said shank portion of the body, whereby when said attachment means is adjusted axially on said connecting element toward said head portion of the body, the said force-transmitting portion effects axial compression of said head portion of said body between said members and also effects axial compression with consequent lateral outward expansion of said shank portion on the side of the first-mentioned member remote from the other of said members.

6. An expansible rivet comprising a deformable head of elastomeric material at one end thereof and a deformable hollow shank of said elastomeric material and of lesser outside dimension than said head integral with said head and a bore extending axially through said head and said shank, rigid stop means extending axially within said bore in said head and having an axial opening therethrough to accommodate a connecting fastener member, and rigid member-engaging means held to said shank and disposed within said bore in said shank axially spaced from said head and from the axially inner end of said stop means, said member-engaging means extending toward the other end of the rivet and engaging the wall of said bore and having end means of an outside dimension not greater than that of said shank and bonded to the axial outer face of said shank, said member-engaging means having an axial bore with means therein for adjustably engaging the connecting fastener member axially along the latter, and the spaced-apart rigid stop and member-engaging means being in axial alignment, whereby to contact one another when said head is axially compressed and said deformable shank is axially compressed with consequent radially outward expansion by axial compression force applied toward said head through the connecting fastener member inserted from the head end and adjusted axially on said member-engaging means.

7. An expansible rivet comprising a deformable head of elastomeric material at one end thereof and a deformable hollow shank of said elastomeric material and of lesser outside dimension than said head integral with said head and an axial bore extending through said head and said shank, a rigid hollow stop element within said bore in said head of a length exceeding the major part of the thickness of said head and having an axial bore therethrough to accommodate a threaded connecting fastener member, and a rigid hollow member-engaging element held to said shank and disposed within said bore in said shank axially spaced from said head and from the axially inner end of said stop element for adjustably engaging the connecting fastener member axially along the latter, said member-engaging element extending to the other end of the rivet and engaging the wall of said bore of said shank and having end means of an outside dimension approximately equal to that of said shank supporting and bonded to the axial outer face of said shank, said member-engaging element having a threaded bore therein of less diameter than the bore in said shank and in said stop element, and the spaced-apart rigid stop and member-engaging elements being in axial alignment, whereby to contact one another when said head is axially compressed and said deformable shank is axially compressed with consequent radially outward expansion by axial compression force applied toward said head through the threaded connecting fastener member inserted from the head end and threadedly engaged with and adjusted axially on said member-engaging element.

8. An expansible rivet comprising a deformable head of elastomeric material at one end thereof and a deformable tubular shank of said elastomeric material and of lesser outside diameter than said head integral with said head and an axial bore extending through said head and said shank, a rigid tubular stop element within said bore in said head of a length exceeding the major part of the thickness of said head and having a smooth axial bore therethrough to accommodate a threaded connecting fastener member, and a rigid tubular member-engaging element within said bore in said shank axially spaced from said head and from the axially inner end of said stop element for adjustably engaging the connecting fastener member axially along the latter, said member-engaging element extending to the other end of the rivet and continuously engaging the wall of said bore of said shank and including a radial end flange of outside diameter equal to that of said shank contacting and adhesively bonded to the axial outer face of said shank, said member-engaging element having a threaded bore therein of less diameter than the bore in said shank and in said stop element, and the spaced-apart rigid stop and member-engaging element being in axial alignment, whereby to contact one another when said head is axially compressed and said deformable shank is axially compressed with consequent radially outward expansion by axial compression force applied toward said head through the threaded connecting fastener member inserted from the head end and threadedly engaged with and adjusted axially on said member-engaging element.

9. A tubular rivet comprising a deformable flat circular head of elastomeric material at one end thereof and a deformable tubular shank of said elastomeric material and of lesser substantially uniform outside diameter than said head integral with said head and an axial bore extending through said head and said shank, a rigid tubular stop element within said bore in said head of a length approximately equal to the thickness of said head and including a radial annular end flange entirely covering and seated against the flat outer surface of said head and a smooth bore of less diameter than that in said shank to accommodate a threaded connecting fastener member, and a rigid internally threaded tubular member-engaging element within said bore in said shank axially spaced from said head and from the axially inner end of said stop element for adjustably engaging the connecting fastener member axially along the latter, said member-engaging element extending to the other end of the rivet and continuously engaging the wall of said bore of said shank and including a radial annular end flange of an outside diameter equal to that of said shank contacting and adhesively bonded to the axial outer face of said shank, the threaded bore in said member-engaging element being of less diameter than the bore in said shank and in said stop element, and the spaced-apart stop and member-engaging elements having rigid continuous annular walls thereof in axial alignment, whereby to contact one another when said head is axially compressed and said deformable shank is axially compressed with consequent radially outward expansion by axial compression force applied toward said head through the threaded connecting fastener member inserted from the head end and threadedly engaged with and adjusted axially on said member-engaging element.

10. A detachably interconnected and cushioned structure comprising a pair of spaced-apart rigid apertured members, a cushioning body of deformable elastomeric material having an enlarged head portion between the said members and an integral shank portion extending through the said aperture in one of the members, said body having a bore therethrough aligned with the aperture in the other of said members, a connecting element provided with a head engaging the said other member and a shank extending through the said other member and into said bore, said body including attachment means continuously engaging the wall of said bore and bonded to the axial outer face of said shank portion and adjustably engaged with the said shank of the connecting element axially along the latter in a manner exerting an axially directed compressive force on the said axial outer face of the shank portion so that the said head portion of said body is axially compressed between said members and the said shank portion of said body is axially compressed with consequent laterally outward expansion on the side of the first-mentioned member remote from the said other of said members thereby providing an annular bulged portion of greater diameter than the said aperture in the first mentioned member, and a stop element within said bore of the body and around said connecting element and limiting the extent of axial shortening of said body due to said compressive force.

References Cited in the file of this patent

UNITED STATES PATENTS

| | | |
|---|---|---|
| 2,456,480 | Austin | Dec. 14, 1948 |
| 2,828,095 | Beck et al. | Mar. 25, 1958 |